United States Patent [19]

Hauer

[11] Patent Number: 5,006,843
[45] Date of Patent: Apr. 9, 1991

[54] SECURITY MODULE TO PRECLUDE UNAUTHORIZED USERS TO OPERATE MOTOR DRIVEN EQUIPMENT AND TO PROTECT VALUABLE PARTS OF THE MOTOR FROM UNAUTHORIZED EXCHANGE

[76] Inventor: Werner Hauer, 40 Fieldcrest Rd., Parsippany, N.J. 07054-2411

[21] Appl. No.: 517,430

[22] Filed: May 2, 1990

Related U.S. Application Data

[63] Continuation of Ser. No. 278,575, Dec. 1, 1988, abandoned.

[51] Int. Cl.$^5$ .......................... B60R 25/00; H04Q 9/00
[52] U.S. Cl. ............................. 340/825.31; 180/167; 180/287; 307/10.4; 307/10.6; 307/10.2; 361/172; 340/825.3
[58] Field of Search ................. 70/277, 278; 307/10.1, 307/10.2, 10.3, 10.4, 10.5, 10.6; 340/825.31, 825.34, 825.69, 825.72, 825.32, 426; 361/172; 180/287, 167

[56] References Cited

U.S. PATENT DOCUMENTS

| | | |
|---|---|---|
| 4,236,594 | 12/1980 | Ramsperger ...................... 307/10.1 |
| 4,463,340 | 7/1984 | Adkins et al. .................. 340/825.32 |
| 4,660,528 | 4/1987 | Buck .................................... 180/167 |
| 4,673,914 | 6/1987 | Lee ...................................... 361/172 |
| 4,682,062 | 7/1987 | Weinberger ..................... 307/10.2 |
| 4,683,462 | 7/1987 | Takeda et al. .................. 340/825.32 |
| 4,809,199 | 2/1989 | Burgess et al. ................. 340/825.31 |
| 4,852,680 | 8/1989 | Brown et al. ...................... 307/10.2 |
| 4,888,575 | 12/1989 | De Vaulx .......................... 307/10.4 |

*Primary Examiner*—Donald J. Yusko
*Assistant Examiner*—Eric O. Pudpud

[57] ABSTRACT

The disclosure describes a security system for motor driven vehicles and motor operated plants which uses a micro-chip that is mounted inside vital motor accessories and prevents these accessories from operating without the entry of a 4-digit code word. The micro-chip consists of a silicon substrate and an added semiconductor-switch that adapts the micro-chip to the various switching requirements of the various types of motor accessories. The silicon substrate carries all circuitry for data entry, data storage, comparison, evaluation and control functions and is designed to store data without power. Special circuits are provided to adapt the unit to a number of service requirements, such as maintenance, automatic code entry, and erasure of forgotten codes.

8 Claims, 3 Drawing Sheets

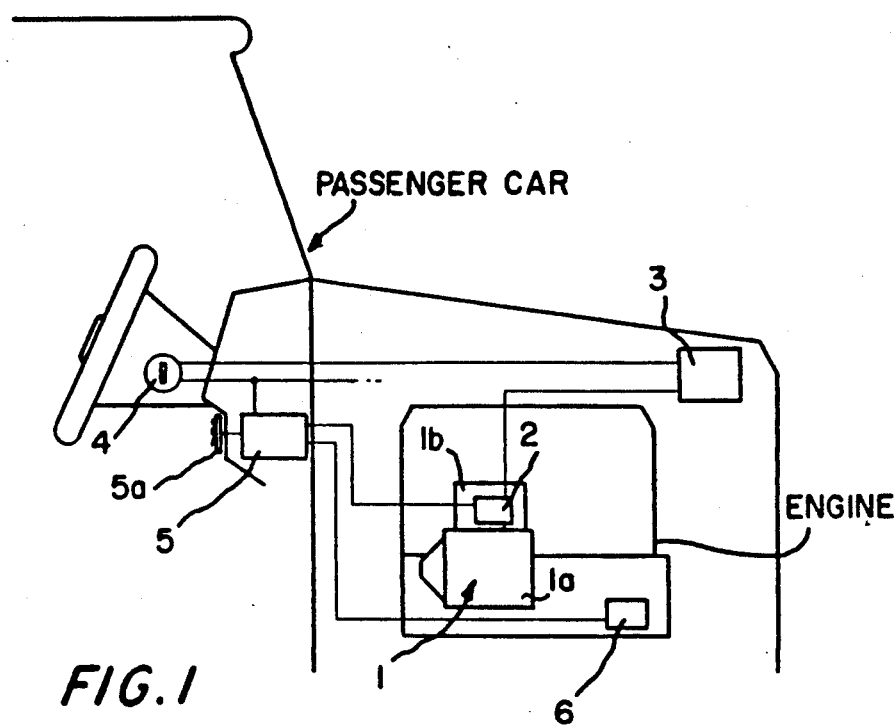
FIG.1
FIG.2
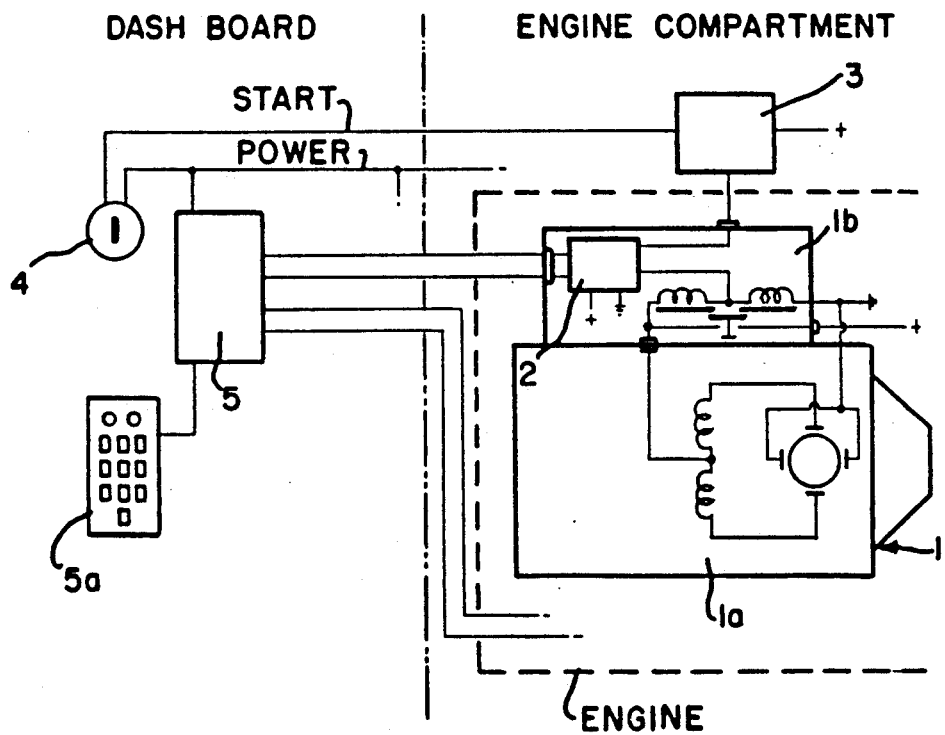

SECURITY MODULE TO PRECLUDE UNAUTHORIZED USERS TO OPERATE MOTOR DRIVEN EQUIPMENT AND TO PROTECT VALUABLE PARTS OF THE MOTOR FROM UNAUTHORIZED EXCHANGE

This application is a continuation of application Ser. No. 07/278,575 filed on Dec. 1, 1988, now adandoned.

BACKGROUND

The monetary value of automobiles is extremely high as is the value of earth moving and construction equipment. Vehicles, often, have to be parked in areas where the owner can not exercise close supervision. Vehicles and equipment, frequently, must remain unguarded for several days. Professional thieves have developed techniques to steal entire vehicles, when parked in unguarded areas, by bypassing the locking devices or to exchange expensive engines or parts with wornout ones, even when parked in guarded parking areas.

Manufacturers have responded to this problem and developed devices that require special codes to gain entrance to the car or that sound alarms on unauthorized entry. Other devices require special procedures to start the engine of the vehicle or permit the engine to run. Practically all of these devices can be disabled or bypassed by a knowledgeable thief since these devices are accessible either in the cabin or in the engine compartment and are powered by the vehicle.

Any device that shall improve a car's or other motor driven equipment's resistance against the skillful manipulation of a professional thief must be designed so that neither makeshift connections on the terminals of the engine accessories nor the tampering with the security device nor the removal of power will disable the security system or permit the engine to start. One way to achieve this, is to make the protective system an internal part of the engine block or its attached vital accessories, such as the starter, the ignition system, the fuel pump or the like. In this manner it becomes impossible to access, remove, replace or disable the protective system as long as the engine block is in its place.

This places great size limitations on the security module, as it must be small enough to fit inside the vital accessory (e.g. the distributer, the solenoid of the starter, the electrical fuel pump, etc.). All security modules of a vehicle would have to be interfaced with a central control unit at the dashboard or a master control to receive the authorization codes and to signal their disabled state. Such interface is done with communication links (e.g. electrical or fiber optic), which are by nature vulnerable to tampering and allow a thief to inject false code words into the security modules. Means must be provided that prevent a hi-tech thief to enter codes in succession but must allow the rightful owner to enter the right code after he made a mistaken entry and must allow the rightful owner to enter the right code after a thief has tried to enter one or several wrong code words.

BRIEF SUMMARY OF THE INVENTION

The invention is a security system for motor powered plants, mobile, portable or stationary, in which a security module on a microchip, (called "Code Module") is implanted in the vital accessories of the motor block. The Code Module must be enabled by external code signals from a Code Sender in the dashboard, to permit the operation of the accessory and of the motor.

The design of such a micro-chip became possible due to recent technological advances that permit the design of Large Scale Integrated Circuits (LSI) that contain the entire circuitry for such a device on a single substrate, including ferroelectric memory components that are non-volatile. The Code Module consists of such an LSI chip and a DC-switch, mounted on a carrier that also has wire terminals. The Code Module can easily be placed inside the vital accessories of the motor and be made part of the internal circuit of that accessory. This way, it prevents the operation of the accessory and of the entire power plant unless a proper authorization code is received from the external Code Sender.

The Code Module, in its simplest form, has the means to store one code word which it retains even under power-fail conditions in conjunction with a data entry circuit and a comparator. The entry of a code word that matches the one already stored is recognized by the comparator and enables the functional electrical circuit of the accessory. This functional circuit is always disabled unless the Code Logic has received a matching code word over the transmission link from the Code Sender.

The Code Sender is an electronic device with a key board that accepts a 4-digit entry, processes it for serial transmission and forwards it to all Code Modules of the vehicle or plant. The Code Sender may store a 4-digit Op-Code for automatic operation under safe (parking) conditions. Disabled Code Module units send a disabled code to the Code Sender which displays the condition to the driver as long as it exists. The Code Sender can also perform supervisory functions on non-functional vehicle parts, to check for their presence and originality which protect hi-value parts against theft and unauthorized replacement. The Code Sender also accepts key board commands to change the stored operation code.

Such an arrangement makes the electrical circuit truly tamper proof, due to the fact, that the Code Module is totally integrated with an engine accessory which makes it so much part of the engine block, that its removal would require the removal of the engine itself. This makes it impossible, even for hi-tech thieves, to use external means to start the engine.

The transmission link for code entry is electronically protected through a response block. It allows the entry of 3 false code words after which it disables further code entry for an extended time period. Every single false code entry, thereafter will renew the disable time period.

BRIEF DESCRIPTION OF THE FIGURES

FIG. 1 shows a cross section through the front portion of an automobile with the components of the security system in their place.

FIG. 2 shows a block diagram of the security system, with the Code Module integrated into the solenoid of the starter of an automobile.

DETAILED DESCRIPTION OF THE INVENTION

Figure 3A:
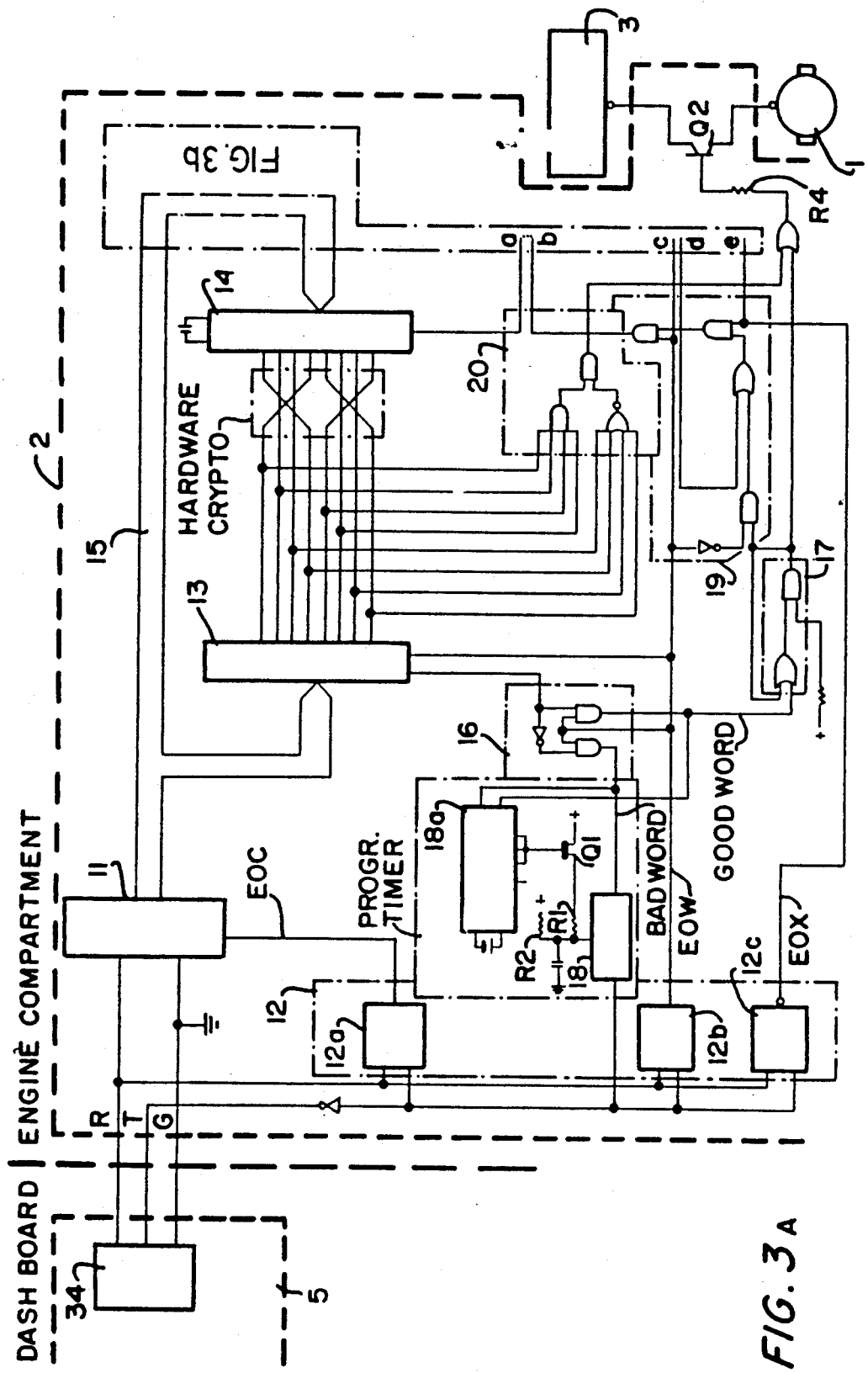
FIG. 3A and 3B show a functional diagram of the CODE MODULE with all essential components.

The description of the security system refers to the application of the system in an automotive gasoline vehicle. Applications in other vehicles or in stationary plants are possible without changes of the components of the security system or its operation. For the description is assumed the vehicle to be in a secured (Armed) state. Operational features of other states are injected as separate explanations where necessary.

FIG. 1 shows a cross section of an automotive vehicle with the major components of the vehicle, such as the engine, the starter, the steering wheel and the dash board to which the components of the security system are added, namely the Code Module and the Code Sender.

Two Code Module units are shown, the first, an active unit (2) which is an integral part of the starter, representing a vital accessory, a second, passive unit (6), which is mounted securely in the engine block. The active unit (2) is mounted in the solenoid of the starter and controls the starter circuitry to operate only after it has received a valid data word. The passive unit (6), a non-removable part of the engine block performs no functions. The exchange of the engine would necessarily exchange the Code Module and indicate by its response that it has the wrong data word in its memory and has been exchanged or indicate by its failure to respond the absence of the part, a disconnect, or replaced engine without a Code Module.

The Code Sender is shown as a separate, self contained unit (5) in the dash board with an associated numeric key pad (5a), shown on the front of the dash board, close to the ignition key (4). However, the majority of these functions can easily be part of an on-board computer of the vehicle or of the control computer of a power plant which would reduces unit (5) merely to a module interface.

The figure shows also parts of the starter wiring and the interconnect wiring between the vehicle components and the security system. The ignition key (4) is shown with the "power" and the "starter" connection, which, by design, turns on the power first and turns on the starter later and only for the duration of the momentary overthrow of the ignition key. The code sender is initialized in the first step of the Ignition Switch with the appearance of power and stays energized as long as power is present. The starter circuits are energized only for the duration of ignition switch overthrow.

The power circuits are the conventional power circuits for an automobile, supplying electrical power to all subsystems, such as the engine, the lights, the signaling system and all electrical accessories. The starter circuits are those for the starter relay (3) and for the solenoid (1b) of the starter (1). The interconnect wiring is the wiring between the code sender (5) and the Code Modules (2 and 6), which are three-wire cables, and the wiring between the numeric key pad (5a) and the code sender (5), which is a multiconductor cable.

FIG. 2 shows the details of the interconnections of the Code Module with the circuit of the solenoid of the starter. The internal wire from the starter relay (3) to the coil of the solenoid is interrupted by the Code Module (2) and prevents the use of the starter as long as the Code Module is not conducting. In addition, the Code Module connects to the three-wire cable from the Code Sender (5) or its equivalent and to the power leads inside the solenoid body. The high-current connections between the solenoid and the starter motor (1a) remain unchanged but may vary between starter types.

FIG. 3A, shows the basic circuitry of the Code Module (2). Page 2 of FIG. 3 shows complementary circuitry, which is not essential for the basic function and will be discussed later. Page 1 shows that the Code Module is connected to the line interface (34) of code sender (5) and shows the connection of the electronic switch (Q2) in the lead from the starter relay (3) to starter motor (1a). In passive Code Modules, the electronic switch output remains unused. The Code Sender (5) is connected to the Code Module (2) via one transmit (T), one receive (R) and one ground (G) lead. The signal on the receive signal lead consists of a string of clock pulses with data added. A 1-bit added to the clock pulse will quadruple the size of the clock pulse, a 0-bit leaves the clock pulse unchanged. This pulse string is transmitted automatically as soon as power is turned on when the Security System is in the DISARMED mode. The pulse string will be transmitted immediately after code entry in any of the ARMED modes.

The incoming signal is delivered to the serial to parallel converter (11) and to the signal detect arrangement (12). The signal detect arrangement (12) consists of three individual detectors, one for the detection of end of clock [EOC] (12a), one for end of word [EOW] (12b), and one for end of transmission [EOX] (12c). The EOC signal is used to clock the serial to parallel converter (11), which will load the data in serial form and present those to the data bus in parallel format. After all bits of a code word are delivered, the EOW detector (12b) will produce the the EOW signal. This will enable the comparator (13), which compares the data on the data bus (15) and the data previously stored in the power-independent code memory (14). A coincidence will produce a 'high' output on the lead from the comparator (13) to the Word Logic (16) and the "good-word" output of the Word Logic will go high. A difference between the data on the Data Bus (15) and the data of Code Memory (14) will leave the comparator in the 'low' state and Word Logic (16) will let the "bad-word" output go high.

A good word signal will transfer the AND/OR gate latch (17) into the high state and will open up the starter transistor Q2, to prepare for the immediately following start command. The transistor (Q2) will allow the start command to be executed and will remain conductive until the engine is turned off. A bad word signal will not turn on the starter transistor (Q2) but will instead trigger the timer circuit (18) and will shift its shift register (18a) one position. This shift will be of no effect as it continues to deliver a voltage to the analog switch/resistor combination (Q1/R1) of the timer (18), reducing the discharge time of the timing circuit to a minimum. The signal detector arrangement (12) will be disabled and a "Disabled" signal is sent to the Code Sender for the short time the timer (18) is turned on. The occurance of more than three bad word indications will shift the Shift Register (18a) into the fourth position and the Q1/R1 discharge is no longer effective. The Timer (18) is transfered into the long-time mode (1 hr) and remains in that mode until a "Good word" detect resets the Shift Register (18a). As long as the Timer (18) is in the time-out condition, the Code Sender (5) will indicate accordingly on its Key-Board (5a), to inform the user of the disabled security circuit.

A bad word condition will not occur in the "Disarmed" operating mode since a stored operational code word will be used automatically over and over. The bad word condition occurs when the driver considers the area where the car is parked unsafe, changes the code word to a new temporary one, which he only remembers, and which must be entered for the next engine start. Thru this action he invokes the "ARMED" status. If a potential thief attempts to start the car with the wrong code word or the driver entered the wrong code word by mistake he will not succeed in starting the vehicle. The code logic will go into the bad word condition and will trigger after a number of false attempts (3 for the description) the long-time delay, which precludes the entry of code words for an extended time period. The entry of a valid code word after a number of wrong code words have disabled the device, will enable the starter and reset the Timer (18) and Shift register (18a) to minimum cycle time.

The Code Module provides for unlimited storage of the code word, as components of unforgettable memories (ferroelectric or equivalent) are used for data storage. The logic also provides for rewriting of the stored code words through the Code Sender (5) by sending a new code word immediately after the old valid code word. A second code word that follows the first (valid) code word before the EOX time (12c) has expired will energize the 2nd Word Logic (19) and will command the Code Memory (14) to read the new word, now on the data bus, in the following way. The arrival of a new pulse series, forces the EOW output low again and opens the input AND gate of the Second word latch (19) which transfers the ON condition from the good word latch (17) onto the 2nd word logic (19). As soon as the second pulse string is ended, the EOW output goes hi again and a transfer signal to the code memory (14) is produced.

The Code Module provides also for a "maintenance" state in which a specific stored code word enables the host device (starter) permanently and no external code word is required for start up. By entering the code word "33" (in this 8 bit sample circuit) a Null Code Detect logic (20) will respond to the presence of the specific code word and will deliver a high-output which continually enables the transistor Q2 in the starter circuit via an OR gate and allow for the use of the car at all times. Such a Maintenance mode is necessary for the delivery of a new car, for service of the car and for replacement starters. The Maintenance state can be ended by the owner at any time by entering a code word of his choice.

Figure 3B:
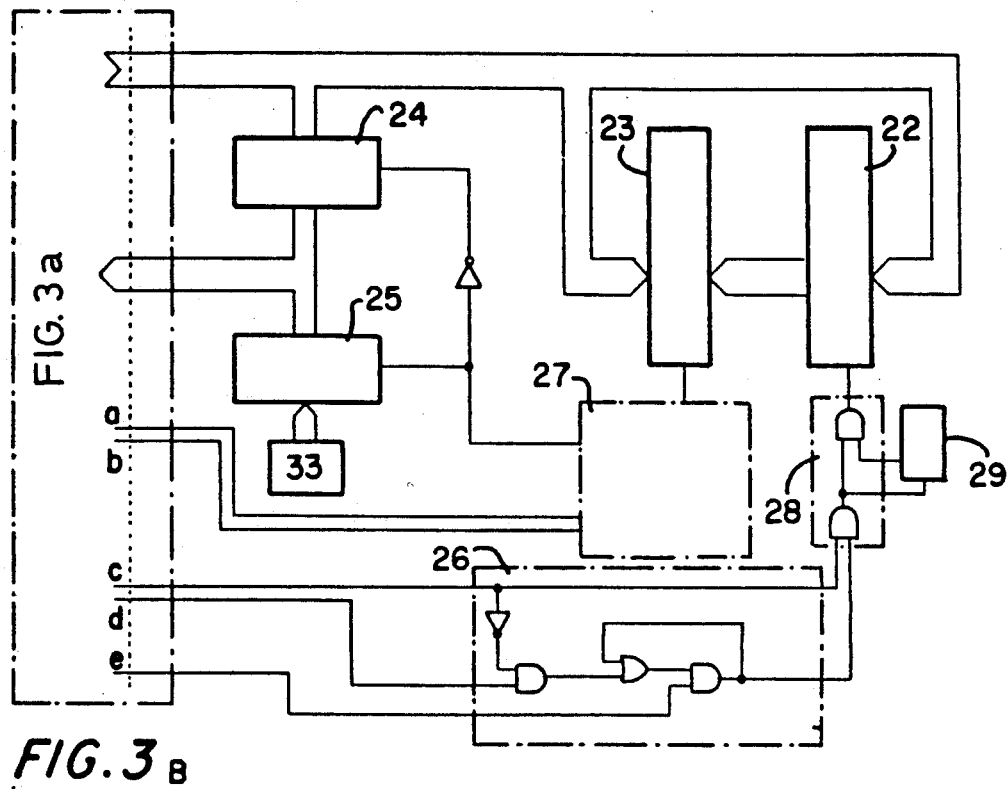

FIG. 3B shows additional circuitry which permits the permanent storage of a second code word. This second code word is used only in emergencies and remains known only to the owner of the car. It can be entered only once and remains in the Memory of the Code Module forever. The insertion of the second code word would normally be done when the owner customizes his Code Module for the first time. To do so, he must enter three code words into the Key-Board (5a) of the Code Sender (5), in the following sequence: "Maintenance-code-word,*,Operational-code-word,*,Emergency-code-word,#". The owner will use this Emergency-code-word only if an Alarm-code-word was entered and forgotten. The Code Module will be transfered into the Maintenance mode thru the use of the Emergency-code-word.

The circuitry of FIG. 3B consists mainly of a Code Memory (22), a Comparator (23), a pair of Tri-state Buffers (24 and 25), a Third-word-latch (26) and a Force-clear logic (27). In normal operation only the Tri-state-buffer (24) is of effect which connects the Data Bus (15) to the Code Memory (14) of page 1. Only when the Emergency-code-word is entered or used will the additional circuitry start to function.

As described earlier, the Emergency-code-word will be entered as a third code word in the receive data string. This means that the circuitry on page one has detected and processed the first two code words as described. The third code word will arrive before the EOX time has expired and will force the EOW lead Low again. The Second-word logic (19) in the ON state and the EOW lead Low will transfer the third-word logic (26) into the ON state. As soon as the EOW lead goes Hi again, the Code Memory logic (28) will respond by forwarding the signal to the Code Memory (22) and the one-time flip flop (29). A "Read" command will be given to the Code Memory (22) and the One-time flip flop (29) will be switched. This One-time flip-flop has unforgettable memory components and can only be switched once, this will prevent a change of the memory contents of Code Memory 2 (22) for all times.

The use of the Emergency-code-word will be detected by Comparator (23), which checks every entered code word after the EOW signal goes Hi. The presence of the Emergency-code-word will force the output of Comparator (23) Hi and will start the Force-clear-logic (27). The Force-clear-logic will generate a 10 ms pulse on the enable lead for the Tristate Buffers (24 and 25) which disables Buffer (24) and enables Buffer (25). This delivers the hardwired data word "33" to the data input of Code Memory (14) of page 1. The Force-clear-logic delivers during the 10 ms pulse a 1 ms write strobe to the Code Memory (14) to transfer this data word into memory (22). The Code Module is now restored to the Maintenance mode and the vehicle is useable without any code entry by the driver.

Figure 4:
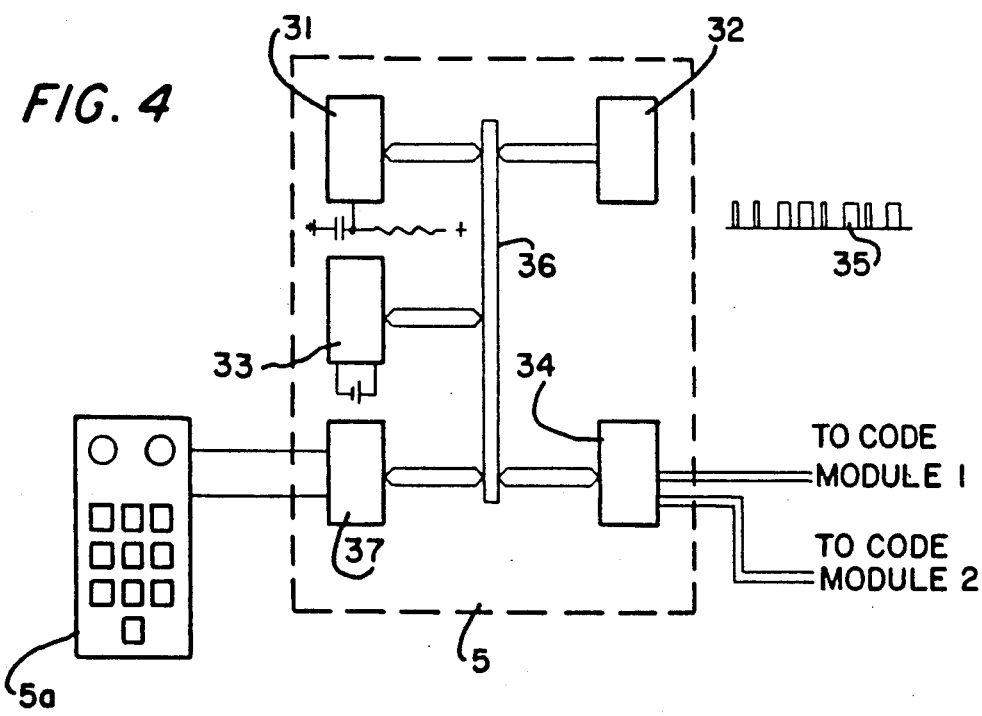
FIG. 4 shows a functional diagram of the CODE SENDER with the KEY BOARD and all essential components.

FIG. 4 shows a block diagram of a micro processor system with its main components, which can perform the functions of a code sender for the security system. The processor (31), the key board (5a) and the program memory (32) are conventional equipment and their functions can easily be performed by a processor with Keyboard that is already part of the car (or plant) electronics. The data memory (33) and the line interface (34) are custom devices that would have to be added to an existing system if such a system is used.

The Line Interface (34) accepts 8 bit data words and converts those to a serial bit stream of 8 clock pulses with data added to the clock signals (as shown in (35)). A bit of the value "0" is only the clock pulse with a long pause (0.1 ms pulse 0.9 ms pause) while a bit of the value "1" is the clock pulse with the data bit added and a short pause (0.6 ms pulse 0.4 ms pause). The line interface also accepts an incoming DC signal from the Code Module and delivers an 8 bit data word to the data bus (36) and to the Keyboard Interface (37). This indicates on the Keyboard (5a) the ON and OFF condition of the Code Modules.

The Data Memory (33) is an unforgettable read/write memory (5 bytes of 8 bits) that retains its information even in absence of power. Ferroelectric or EEPROM's may be used. Two bytes are used for the storage of the operating code word (future 16 bits), one byte is used for storage of a status word (8 bits) and two bytes may be used for a crypto code if encryption is used to achieve a discrepancy between keyboard entry and transmission signals, to prevent an electronic intercept of newly entered code words.

The Processor (31) is programmed so that it will, after power is turned ON, look up the status byte in the Data Memory (33). If the status byte indicates Disarmed mode, the processor will read the Operating Code word, also in Data Memory (33), and will deliver the operating code word to the Line Interface (34) and the Code Module to enable the starter. If the status byte indicates the Armed mode, the processor will not transmit the operating code word but will deliver a "Code Request" to the Keyboard Interface (37) and have the Keyboard (5a) show that a code word is to be entered before the ignition key is turned to the "Start" position. If the driver turns the ignition key to that position without entering a code word, a tone will alert the driver. As the processor (31) scans the Keyboard continuously, it will process a code word as soon as it is entered and pass it on to the Line Interface (34) and to the Code Module, to enable the starter.

The driver may at any time enter a group of code words, which will be recognized by the Processor (31). The Processor will analyze the code word group and will respond in one of five ways:
 (1) Code Module initialization,
 (2) One-time authorization
 (3) Temporary code word change,
 (4) Code word restoration,
 (5) Permanent code word change.

The number of code words and the value of the first code word are the indicators for the processor to form the data string to the Line Interface (34) and to the Code Module (2 or 6) and to store the Operating code word in the Data Memory (33) if needed.

What is claimed is:

1. A security system for a motor vehicle having a dashboard and an engine compartment containing a motor and one or more vital motor accessories comprising:
    a source of vehicle electrical power;
    a keyboard for generating data words;
    a code sender in the dashboard coupled to the keyboard including means for outpulsing the generated data words from the keyboard;
    at least one security module implanted within one of the vital motor accessories comprising;
    means for permanently storing a distinct data word; and
    means responsive to the received data word matching the distinct data word for generating the first signal; and
    means coupled between the code sender and each security module for transmitting data words between the code sender and each security module including means for sending the generated data words to the at least one security module;
    the at least one security module comprising;
    means coupled to the transmitting means for receiving the data words outpulsed from the code sender;
    a code memory for storing a predetermined data word;
    means coupled to the code memory and to the means for receiving the data words outpulsed from the code sender responsive to the predetermined word in the security module code memory matching one of the data words outpulsed from the code sender for generating a first signal; and
    means responsive solely to the first signal for enabling the one vital motor accessory to function only when the data word received from the code sender matches the predetermined data word stored in the code memory implanted within the vital motor accessory the keyboard further comprises;
    means for forming a first or second status selecting signal, and
    means for coupling the first or second status selecting signal to the code sender;
    the code sender further comprises;
       a processor coupled to the keyboard, the outpulsing means, and the source of vehicle electrical power; and
       a non-volatile memory coupled to the processor for retaining a status code;
    the processor comprising;
       means responsive to the first status selecting signal from the keyboard for storing a disarmed mode status code in the status code retaining memory,
       means responsive to the status code in the status code retaining memory being the disarmed mode status code for generating the distinct data word, and
       means for coupling the distinct data word from the processor to the outpulsing means whereby the distinct data word is outpulsed to the security modules when the vehicle electrical power is turned on;
       means responsive to the second status selecting signal from the keyboard for storing an armed mode status code in the status code retaining memory;
       means responsive to the status code in the status code retaining memory being the armed mode status code for generating a data word request signal when vehicle electrical power is turned on to indicate inserting of a data word; and
       means responsive to the data word request signal for coupling the keyboard to the outpulsing means whereby a data word from the keyboard is sent to the outpulsing means.

2. A security system for a motor vehicle having a dashboard and an engine compartment containing a motor and one or more vital motor accessories according to claim 1 wherein the security module code memory comprises a non-volatile storage device for unlimited retention of the predetermined data word.

3. A security system for a motor vehicle having a dashboard and an engine compartment containing a motor and one or more vital motor accessories according to claim 2 wherein the means for generating the first signal comprises:
    a comparator including;
       a first input coupled to the means for receiving the data words outpulsed from the code sender,
       a second input coupled to the code memory in the security module,
       means for comparing each received data word outpulsed from the code sender coupled to the first input with the predetermined data word from the code memory coupled to the second input, and
       means responsive to one of the received data words on the first input being identical to the predetermined data word from the code memory on the second input in the comparing means for generating the first signal.

4. A security system for a motor vehicle having a dashboard and an engine compartment containing a motor and one or more vital motor accessories according to claim 3 wherein the one or more vital motor accessories comprises
- a starter including a solenoid; and
- the at least one security module implanted within the starter comprises a semiconductor device having first, second and control electrodes; and
- the first and second electrodes of the semiconductor device being in series with the solenoid and the control electrode being coupled to the first signal generating means.

5. A security system for a motor vehicle having a dashboard and an engine compartment containing a motor and one or more vital motor accessories according to claim 3 wherein:
- the code sender further comprises means for receiving data words from the at least one security module;
- the comparator in the at least one security module further comprises means responsive to a received data word outpulsed from the code sender on the first input differing from the predetermined data word from the code memory on the second input for generating a second signal; and
- the at least one security module further comprises means responsive to the second signal for outpulsing a prescribed data word to the data receiving means of the code sender.

6. A security system for a motor vehicle having a dashboard and an engine compartment containing a motor and one or more vital motor accessories according to claim 5 wherein the means responsive to the second signal for outpulsing the prescribed data word further comprises means responsive to each second signal for disabling the security module for a first predetermined time.

7. A security system for a motor vehicle having a dashboard and an engine compartment containing a motor and one or more vital motor accessories according to claim 6 wherein the means responsive to the second signal for outpulsing the prescribed data word further comprises means responsive to a predetermined sequence of second signals for disabling the security module for a second predetermined time longer than the first predetermined time.

8. A security system for protecting a motor vehicle having a dashboard and an engine compartment housing a motor and one or more vital motor accessories from theft comprising:
- a source of vehicle electrical power;
- a keyboard for generating data words;
- a code sender in the dashboard coupled to the keyboard including means for outpulsing the generated data codes;
- at least one security module on a single substrate housed inside one of the vital motor accessories in the engine compartment; and
- means coupled between the code sender and the at least one security module for transmitting the data codes between the code sender and the at least one security module;
- the at least one security module housed inside the vital motor accessory comprising;
- data receiving means coupled to the transmitting means for receiving the data codes outpulsed from the code sender;
- a code memory for storing at least a first prescribed code word;
- means coupled to the code memory and to the means for receiving the data words responsive solely to the first prescribed code word in the security module code memory matching a data word from the data word receiving means for generating a first signal; and
- means responsive to the first signal for allowing the vital motor accessory to be enabled only when the data word from the data receiving means matches the prescribed data word stored in the at least one security module code memory
- means responsive to the first signal and an immediately following data word from the data receiving means for replacing the first prescribed data word in the code memory with the immediately following data word;
- means for permanently storing a second prescribed data word;
- means responsive to the received data word matching the second prescribed data word for generating a second signal; and
- means responsive to the second signal for allowing the vital motor accessory to be enabled;
- the keyboard further comprises;
- means for forming a first or second status selecting signal, and
- means for coupling the first or second status selecting signal to the code sender;
- the code sender further comprises;
- a processor coupled to the keyboard, the outpulsing means, and the source of vehicle electrical power; and
- a non-volatile memory coupled to the processor for retaining a status code;
- the processor comprising;
- means responsive to the first status selecting signal from the keyboard for storing a disarmed mode status code in the status code retaining memory,
- means responsive to the status code in the status code retaining memory being the disarmed mode status code for generating the second prescribed data word, and
- means for coupling the second prescribed data word from the processor to the outpulsing means whereby the second prescribed data word is outpulsed to the security modules when the vehicle electrical power is turned on;
- means responsive to the second status selecting signal from the keyboard for storing an armed mode status code in the status code retaining memory;
- means responsive to the status code in the status code retaining memory being the armed mode status code for generating a data word request signal when vehicle electrical power is turned on to indicate inserting of a data word; and
- means responsive to the data word request signal for coupling the keyboard to the outpulsing means whereby a data word from the keyboard is sent to the outpulsing means.

* * * * *